No. 831,281. PATENTED SEPT. 18, 1906.
M. J. HARWOOD.
NUT LOCK.
APPLICATION FILED MAY 8, 1906.
FIG. 1.
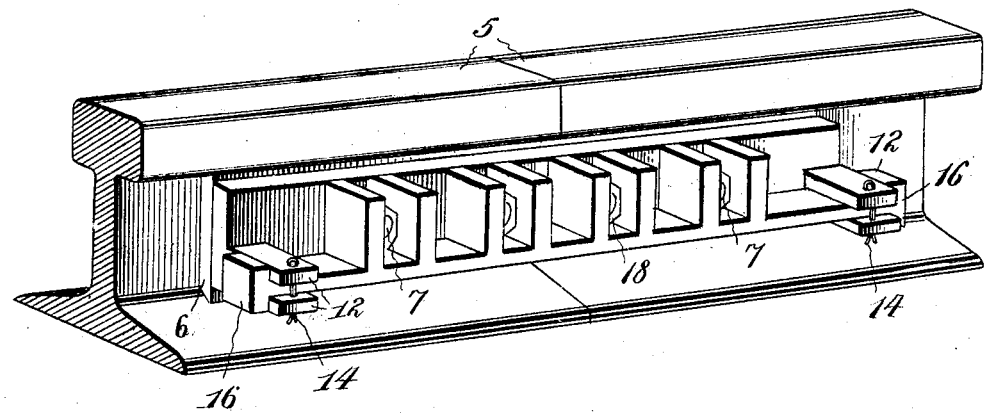
FIG. 2.
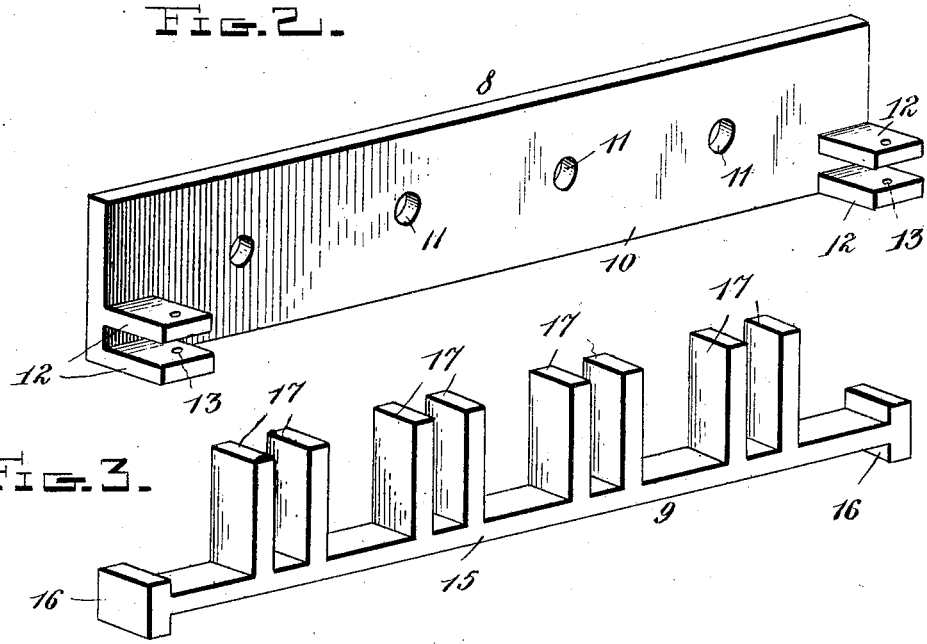
FIG. 3.
WITNESSES:
Jas. a. bach
M. a. Schmidt
INVENTOR
Michael J. Harwood,
BY
Milo B. Stevens and Co.
Attorneys

UNITED STATES PATENT OFFICE.

MICHAEL J. HARWOOD, OF CLEVELAND, OHIO.

NUT-LOCK.

No. 831,281.

Specification of Letters Patent.

Patented Sept. 18, 1906.

Application filed May 8, 1906. Serial No. 315,786.

*To all whom it may concern:*

Be it known that I, MICHAEL J. HARWOOD, a citizen of the United States, residing at Cleveland, in the county of Cuyahoga and State of Ohio, have invented new and useful Improvements in Nut-Locks, of which the following is a specification.

This invention is a nut-lock, and has for its object to provide an improved device of this kind for locking a series of nuts, it being especially adapted for use in connection with rail-joints.

In the accompanying drawings, Figure 1 is a perspective view showing the application of the invention. Fig. 2 is a perspective view of one member of the locking device. Fig. 3 is a perspective view of the other member.

Referring specifically to the drawings, 5 denotes two adjoining rail-sections, which are united by splice-bars 6, fastened by bolts 7 in the usual manner. The locking device comprises two members 8 and 9, respectively, which are clearly illustrated in Figs. 2 and 3. The member 8 comprises a plate 10, having bolt-holes 11. At each end of the plate are vertically-spaced outwardly-extending flanges 12, having vertically-alined openings 13 to receive split keys 14. The member 9 comprises a bar 15, having T-shaped ends 16. A series of vertical projections 17 extend from the top of the bar. These projections are arranged in pairs, according to the number of nuts to be locked, and the distance between the members of each pair is substantially the same as the distance between two opposite sides of the nut, so that when the nut is placed between the projections it cannot turn.

In use the member 8 is placed on the outside of the splice-bars 6 with the bolts 7 extending through the holes 11, after which the nuts 18 are screwed on. The bar 15 is then placed across the plate 10 on the outside thereof and between the flanges 12, with the projection 17 engaging opposite sides of the nuts, all the nuts first being turned until said sides extend in a vertical plane. The T-shaped ends 16 of the bar 15 prevent longitudinal displacement thereof, and the bar is secured against lateral displacement by the split keys 14, which are extended behind the bar through the openings 13 in the flanges 12.

The device herein described can be readily applied, and when so applied securely locks the nuts on the bolts. It is especially adapted for rail-joints, as it also reinforces the splice-bars. No specially-constructed bolt or nut is required, and the ordinary form of splice-bars can be used. The device is also simple in construction and can be cheaply produced, the members 8 and 9 being single castings.

I claim—

1. A nut-lock comprising a plate having bolt-holes, and projecting spaced flanges at its ends, and a bar extending across said plate and between said flanges, and secured thereto, said bar having projections adapted to engage opposite sides of a nut.

2. A nut-lock comprising a plate having bolt-holes, and projecting vertically-spaced flanges at its ends, a bar extending across said plate and between the flanges, and having T-shaped ends, keys extending through the flanges behind the bar, and a series of projections arranged in pairs, extending from the bar, each pair being adapted to engage opposite sides of a nut.

In testimony whereof I have signed my name to this specification in the presence of two subscribing witnesses.

MICHAEL J. HARWOOD.

Witnesses:
JOHN A. BOMMHARDT,
SHULEY J. BOMMHARDT.